(12) United States Patent
Fahrenkrug et al.

(10) Patent No.: US 9,103,600 B2
(45) Date of Patent: Aug. 11, 2015

(54) INJECTOR COOLING APPARATUS AND METHOD

(71) Applicant: Caterpillar Inc., Peoria, IL (US)

(72) Inventors: Matthew Fahrenkrug, Chillicothe, IL (US); Scott Schuricht, Edwards, IL (US); Richard Crandell, Holly Springs, NC (US)

(73) Assignee: Caterpillar Inc., Peoria, IL (US)

( * ) Notice: Subject to any disclaimer, the term of this patent is extended or adjusted under 35 U.S.C. 154(b) by 286 days.

(21) Appl. No.: 13/724,003

(22) Filed: Dec. 21, 2012

(65) Prior Publication Data

US 2014/0174696 A1    Jun. 26, 2014

(51) Int. Cl.
*F01N 3/00* (2006.01)
*F28D 15/00* (2006.01)

(52) U.S. Cl.
CPC ..................................... *F28D 15/00* (2013.01)

(58) Field of Classification Search
CPC ...................................................... F28D 15/00
USPC ........................................... 60/286, 295, 301
See application file for complete search history.

(56) References Cited

U.S. PATENT DOCUMENTS

| | | | |
|---|---|---|---|
| 5,605,042 A * | 2/1997 | Stutzenberger | ................. 60/286 |
| 6,513,323 B1 | 2/2003 | Weigl et al. | |
| 7,168,241 B2 | 1/2007 | Rudelt et al. | |
| 7,703,276 B2 | 4/2010 | Ueno | |
| 7,877,990 B2 | 2/2011 | Buerglin et al. | |
| 7,950,223 B2 | 5/2011 | Breuer et al. | |
| 7,978,965 B2 | 7/2011 | Starck | |
| 8,056,326 B2 | 11/2011 | Cox et al. | |
| 8,122,710 B2 | 2/2012 | Schmale et al. | |
| 2007/0290070 A1 | 12/2007 | Hornby | |
| 2009/0100824 A1 | 4/2009 | Starck et al. | |
| 2009/0277162 A1 | 11/2009 | Cominetti et al. | |
| 2009/0301067 A1 * | 12/2009 | Dingle et al. | ................... 60/286 |
| 2011/0036079 A1 | 2/2011 | Capelle et al. | |
| 2011/0243818 A1 * | 10/2011 | Frederiksen | ................ 423/212 |

OTHER PUBLICATIONS

"After-run Auxiliary Coolant Pump and Fan Switch and Relay Info," forums.quattroworld.com/s4s6/msgs/21503.phtml, posted by UrS4boy on Dec. 3, 2009.

* cited by examiner

*Primary Examiner* — Jason Shanske
(74) *Attorney, Agent, or Firm* — BakerHostetler

(57) ABSTRACT

A system for cooling a reductant injector in an emissions module is provided. The system includes an emissions module, coupled to an engine exhaust duct, and a cooling system fluidly coupled to the emissions module. The emissions module includes a reductant system and a selective catalytic reduction (SCR) module. The reductant system includes a reductant injector having a cooling passage. The cooling system includes a reservoir tank, a supply pump fluidly coupled to the reservoir tank, and a siphon tank fluidly coupled to the supply pump and the reductant injector cooling passage. The siphon tank is disposed proximate to the reductant injector, and a gravitational elevation of a base of the siphon tank is greater than a gravitational elevation of the reductant injector.

17 Claims, 5 Drawing Sheets

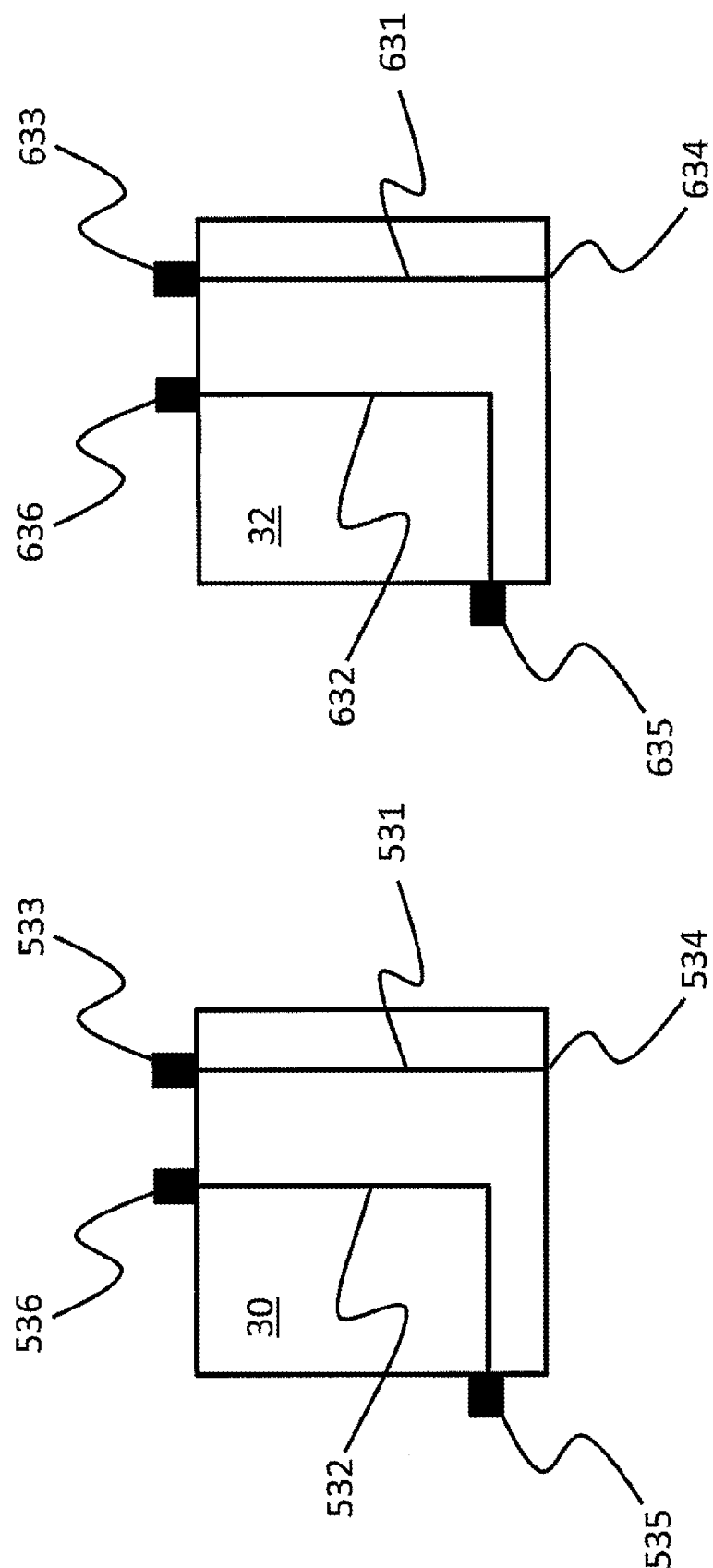

INJECTOR COOLING APPARATUS AND METHOD

TECHNICAL FIELD

The present disclosure relates to fluid injectors. More particularly, the present disclosure relates to apparatus and methods for cooling a fluid injector.

BACKGROUND

Exhaust aftertreatment systems are used to chemically convert or physically remove constituents from a combustion engine exhaust stream. Operation of such exhaust aftertreatment systems may benefit from the ability to inject a fluid into the exhaust stream. For example, some catalytic converters used for selective catalytic reduction (SCR) require injection of reductant into combustion exhaust upstream of the catalyst to effect the desired chemical species conversion. Similarly, regeneration of a diesel particulate filter (DPF) may benefit from upstream injection of a combustible fluid into the exhaust stream. In these cases, a fluid injector would be located upstream of each device.

The fluid injector may include a valve located between a pressurized fluid supply and an injector nozzle, where the injector nozzle is exposed to the exhaust stream. In such an injector, minimizing the distance from the injector valve to the injector nozzle tip may be advantageous with respect to injection spray characteristics and mechanical packaging considerations, but can result in detrimental overheating of the injector valve. Further, overheating of residual fluid within the injector can cause detrimental corrosion or boiling within the injector.

Flow of the fluid through the injector can transfer heat away from the injector. However, some system operating modes may require the injector valve to close for significant time durations, thereby stopping the flow of the fluid through the injector. Accordingly, cooling the injector with the fluid may not be sufficient across all operating modes for an exhaust aftertreatment system.

U.S. Pat. No. 7,877,990 discloses a metering device cooling system including a cooling circuit having a cooling device that transfers heat out of the cooling circuit, where at least a part of the cooling circuit is disposed below the cooling device and at least another part of the cooling circuit is disposed above a point where heat is added to the cooling circuit. However, the need for a cooling device adds undesirable complexity, and may require vehicle motion to drive sufficient heat transfer.

Accordingly, improved apparatus and methods for cooling injectors that are mounted on a combustion engine exhaust duct are desired.

SUMMARY OF THE INVENTION

One aspect of the present disclosure provides a system for cooling a reductant injector in an emissions module. The system includes an emissions module, coupled to an engine exhaust duct, and a cooling system fluidly coupled to the emissions module. The emissions module includes a reductant system and a selective catalytic reduction (SCR) module. The reductant system includes a reductant injector having a cooling passage. The cooling system includes a reservoir tank, a supply pump fluidly coupled to the reservoir tank, and a siphon tank fluidly coupled to the supply pump and the cooling passage of the reductant injector. The siphon tank is disposed proximate to the reductant injector, and a gravitational elevation of a base of the siphon tank is greater than a gravitational elevation of the reductant injector.

Another aspect of the present disclosure provides a method of cooling a reductant injector in an emissions module. The reductant injector has a tip and a cooling passage, and the method includes transferring heat from the tip of the reductant injector to coolant disposed within the cooling passage of the reductant injector, and transporting at least a portion of the coolant from the cooling passage of the reductant injector to a siphon tank via buoyant convection. A gravitational elevation of a base of the siphon tank is greater than a gravitational elevation of the reductant injector.

A further aspect of the present disclosure provides a method of cooling a reductant injector in an emissions module. The method includes de-energizing a cooling system supply pump that is fluidly coupled to the reductant injector, energizing a cooling system auxiliary pump that is fluidly coupled to the reductant injector, and transferring heat from the reductant injector to coolant provided by the cooling system auxiliary pump.

BRIEF DESCRIPTION OF THE DRAWINGS

FIG. 5 presents a schematic of a reductant injector, according to an embodiment of the present disclosure.

FIG. 6 presents a schematic of a regeneration injector, according to an embodiment of the present disclosure.

DETAILED DESCRIPTION

Figure 1:
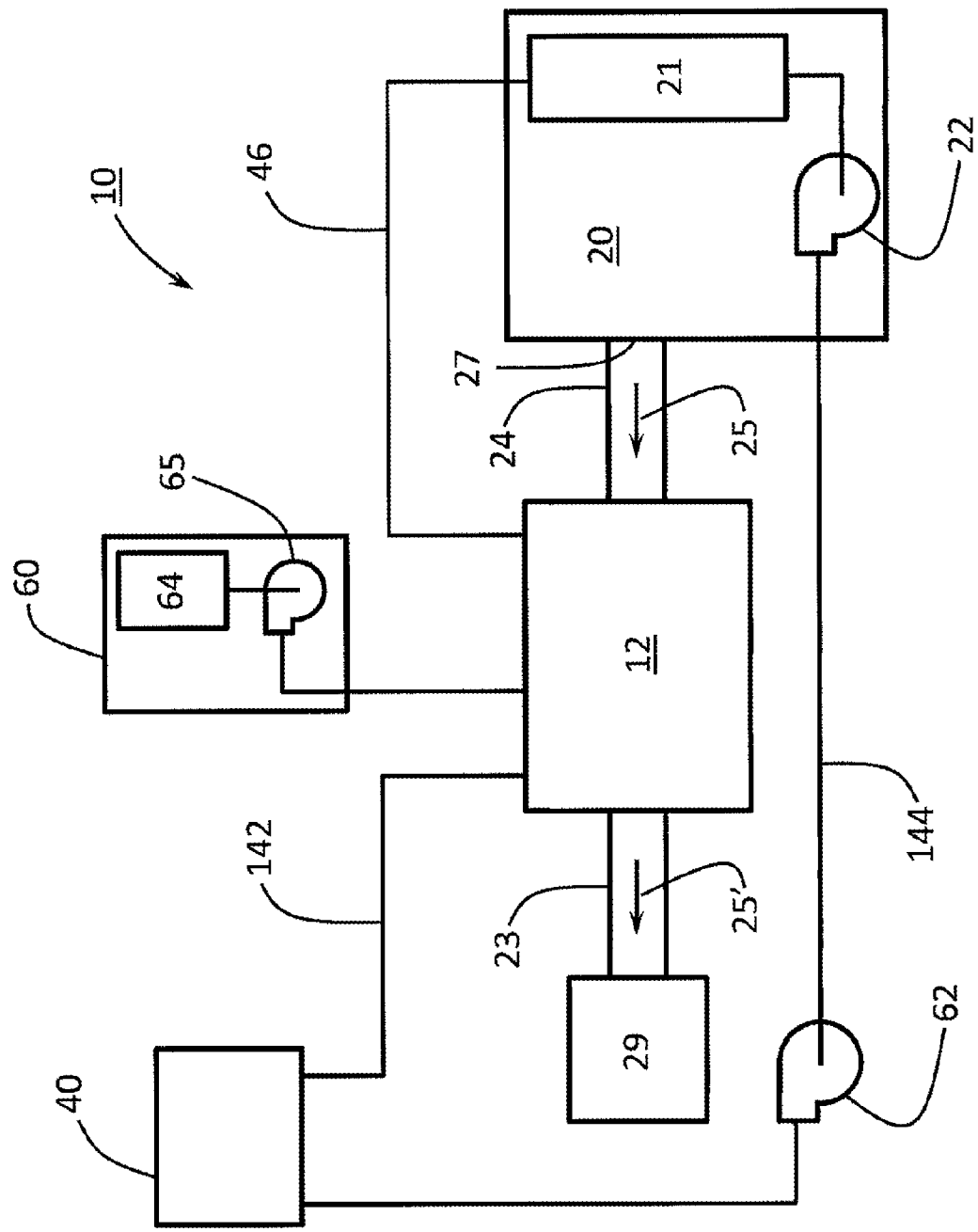
FIG. 1 presents a schematic of a system for cooling an exhaust fluid injector in an emissions module, according to an embodiment of the present disclosure.

FIG. 1 presents a schematic of a system 10 for cooling an exhaust fluid injector in an emissions module, according to an embodiment of the present disclosure.

System 10 includes an emissions module 12 that receives exhaust gas 25 from an exhaust port 27 of combustion engine 20 through an exhaust duct 24, and that provides treated exhaust gas 25' to either an additional exhaust treatment component 29, such as an acoustic muffler, or to an outside through an exhaust duct 23. Engine 20 may be a diesel engine, a spark ignition engine, or various other types of internal combustion engine as would be apparent to one of ordinary skill in the art. Emissions module 12 removes constituents from the exhaust gas 25 or converts constituents in the exhaust gas 25 into other forms. Emissions module 12 includes one or more exhaust aftertreatment devices, such as, for example, a diesel particulate filter (DPF), or a selective catalytic reduction (SCR) module, and injects fluid from an exhaust fluid system 60 into the exhaust gas 25. The exhaust fluid system 60 may include an exhaust fluid reservoir tank 64 and an exhaust fluid supply pump 65. Emissions module 12 may also include a heat exchanger, a mixing chamber, one or more sensors, or various other components as would be apparent to one of ordinary skill in the art.

System 10 also includes a coolant supply pump 22, a coolant reservoir tank 21 and may include a coolant siphon tank 40. Coolant is contained within the coolant reservoir tank 21 and the coolant siphon tank 40. Emissions module 12 is in fluid communication with the coolant siphon tank 40 through coolant line 142, and in fluid communication with coolant reservoir tank 21 through coolant line 46. The coolant siphon tank 40 is in fluid communication with the coolant supply pump 22 through coolant line 144. The coolant supply pump 22 draws coolant from the coolant reservoir tank 21 and propels the coolant into line 144. The coolant supply pump 22 may be driven by mechanical power transferred from the engine 20 by a belt, a drive shaft, or other various motive supplying means as would be apparent to one of ordinary skill in the art.

Optionally, emissions module 12 may receive coolant from an auxiliary coolant pump 62, which receives coolant from the coolant supply pump 22 through coolant line 144. In this configuration, the coolant supply pump 22 need not operate for the auxiliary coolant pump 62 to draw coolant from coolant reservoir tank 21. Further, an embodiment including an auxiliary coolant pump 62 may not include a coolant siphon tank 40.

The auxiliary coolant pump 62 may be driven by a power source independent from the engine 20, such as, for example, a battery, a solar panel, an auxiliary engine, or other various power sources as would be apparent to one of ordinary skill in the art. Thus, the auxiliary coolant pump 62 may drive a flow of coolant through the emissions module 12 independent of the operating state of the coolant supply pump 22 and engine 20. In one embodiment, the auxiliary coolant pump 62 circulates coolant through both the emissions module 12 and the engine 20. Alternatively, the auxiliary coolant pump circulates coolant only through the emissions module 12 through the use of coolant diverter valves (not shown) that bypass the engine 20.

Figure 2:
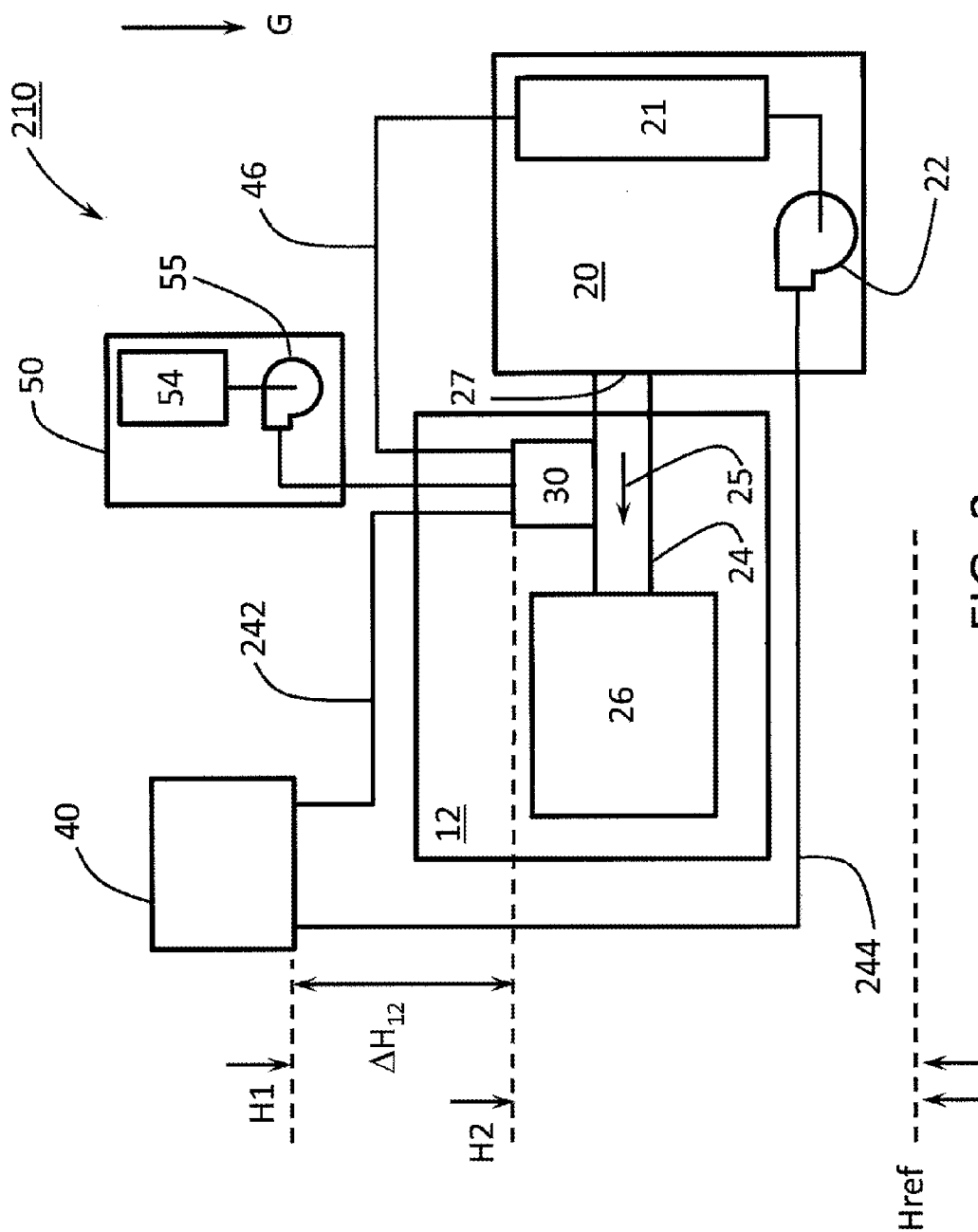
FIG. 2 presents a schematic of a system for cooling a reductant injector in an emissions module, according to another embodiment of the present disclosure.

FIG. 2 presents a schematic of a system 210 for cooling a reductant injector in an emissions module, according to another embodiment of the present disclosure.

The emissions module 12 shown in FIG. 2 includes an SCR module 26 and a reductant injector 30. SCR module 26 receives exhaust gas 25 from the engine 20 through the exhaust duct 24. Reductant injector 30 is in communication with the exhaust duct 24 at a point upstream of SCR module 26. In alternative embodiments, emissions module 12 may include one or more additional exhaust gas aftertreatment systems, such as a DPF.

Reductant injector 30 receives reductant from a reductant fluid system 50 that includes a reductant reservoir tank 54 and a reductant supply pump 55. Examples of reductants that may be injected into the exhaust duct 24 through the reductant injector 30 include diesel exhaust fluid (DEF), urea, ammonia, an aqueous urea solution, ADBLUE (a registered trademark of the Verband der Automobilindustrie e.V), and other materials with similar characteristics.

Reductant injector 30 includes a reductant passage 531 (see FIG. 5) in fluid communication with the reductant supply pump 55, as well as a coolant passage 532 (see FIG. 5) in fluid communication with the coolant supply pump 22 and the coolant siphon tank 40. As shown in FIG. 5, the reductant passage 531 is in fluid communication with a reductant inlet 533 and the tip 534 of the injector 30, and the coolant passage 532 is in fluid communication with a coolant inlet 535 and a coolant outlet 536.

The coolant may include, for example, water, ethylene glycol, a mixture thereof, or other materials with similar characteristics, and may have an atmospheric boiling point equal to or above about 100° C.

Referring to FIG. 2, a base of the coolant siphon tank 40 is located at a gravitational elevation H1 above a reference elevation Href, which is higher than the gravitational elevation H2 of the reductant injector 30 above the reference elevation Href. The gravitational elevations H1 and H2 may be measured along a direction of gravitational acceleration G with respect to the reference elevation Href. In one embodiment, the difference $\Delta H_{12}$ between H1 and H2 is not greater than about 36 inches, as further increases in $\Delta H_{12}$ may offer diminishing returns with respect to the tradeoff between thermal siphon performance and system packaging dimensions. In another embodiment, the difference $\Delta H_{12}$ between H1 and H2 is about 8 inches, as this gravitational potential difference may provide effective thermal siphon performance with favorable packaging dimensions.

In one embodiment, the internal volume of the coolant siphon tank 40 is less than about 116 cubic inches, as further increases in the internal volume of the coolant siphon tank 40 may present diminishing returns in the tradeoff between thermal siphon performance and system packaging dimensions. In another embodiment, the internal volume of the coolant siphon tank 40 is not less than about 20 times an internal volume of the coolant passage 532 (see FIG. 5) within the injector 30, to provide advantageous durations of the thermal siphon effect following an engine 20 shutdown. In yet another embodiment, the internal volume of the coolant siphon tank 40 is not greater than about 200 times an internal volume of the coolant passage 532 (see FIG. 5) within the injector 30, as larger volume ratios may provide diminishing returns in the tradeoff between thermal siphon performance and system packaging dimensions.

In one embodiment, the coolant siphon tank 40 consists of coolant pipes or tubing that are advantageously routed with respect to the gravitational potential H2 of the injector 30 to provide the aforementioned internal volumes at the aforementioned heights above the injectors. In another embodiment, where the coolant siphon tank 40 consists of coolant pipes or tubing, the coolant siphon tank 40 may have an internal cross sectional area, measured transverse to the direction of the acceleration of gravity G, that is not less than about two times an internal cross sectional area of the line 242, measured transverse to the direction of the acceleration of gravity G, as such cross sectional area ratios may advantageously promote the thermal siphon effect following a shutdown of the engine 20.

In yet another embodiment, where the coolant siphon tank 40 consists of coolant pipes or tubing, the gravitational elevation of the coolant pipes or tubing that compose the coolant siphon tank 40 monotonically increases as the pipes or tubing extend away from the reductant injector 30. In other words, according to this embodiment, the gravitational elevation of the pipes or tubing that compose the coolant siphon tank 40 extend either transverse to the direction of gravitational acceleration G or in a direction of increasing gravitational elevation as the pipes or tubing extend away from the reductant injector 30. For example, as shown in the non-limiting embodiment illustrated in FIG. 2, line 242 extends either transverse to the direction of gravitational acceleration G or upward, against the direction of gravitational acceleration G, as line 242 extends from the injector 30 to the coolant siphon tank 40.

As shown in FIG. 2, the coolant siphon tank 40 may be fluidly coupled to the reductant injector 30 through the line 242. The line 242 has sufficient length and internal diameter to meet the requirements for cooling the reductant injector 30 through fluid communication with the coolant siphon tank 40. In one advantageous embodiment of the present disclosure, line 242 has an internal diameter not less than about 0.152 inches, which corresponds, for example, to tubing with an outer diameter of about 0.25 inches and a wall thickness of about 0.049 inches. Internal diameters smaller than about 0.152 inches may unduly hinder the thermal siphon effect between the injector 30 and the coolant siphon tank 40 because of increasing surface tension and friction effects. In another advantageous embodiment of the present disclosure, line 242 has an internal diameter not greater than about 0.43 inches, which corresponds, for example, to tubing with an outer diameter of about 0.5 inches and a wall thickness of about 0.035 inches. Internal diameters greater than about 0.43 inches may provide diminishing returns in thermal siphon performance with respect to system cost and size.

Figure 3:
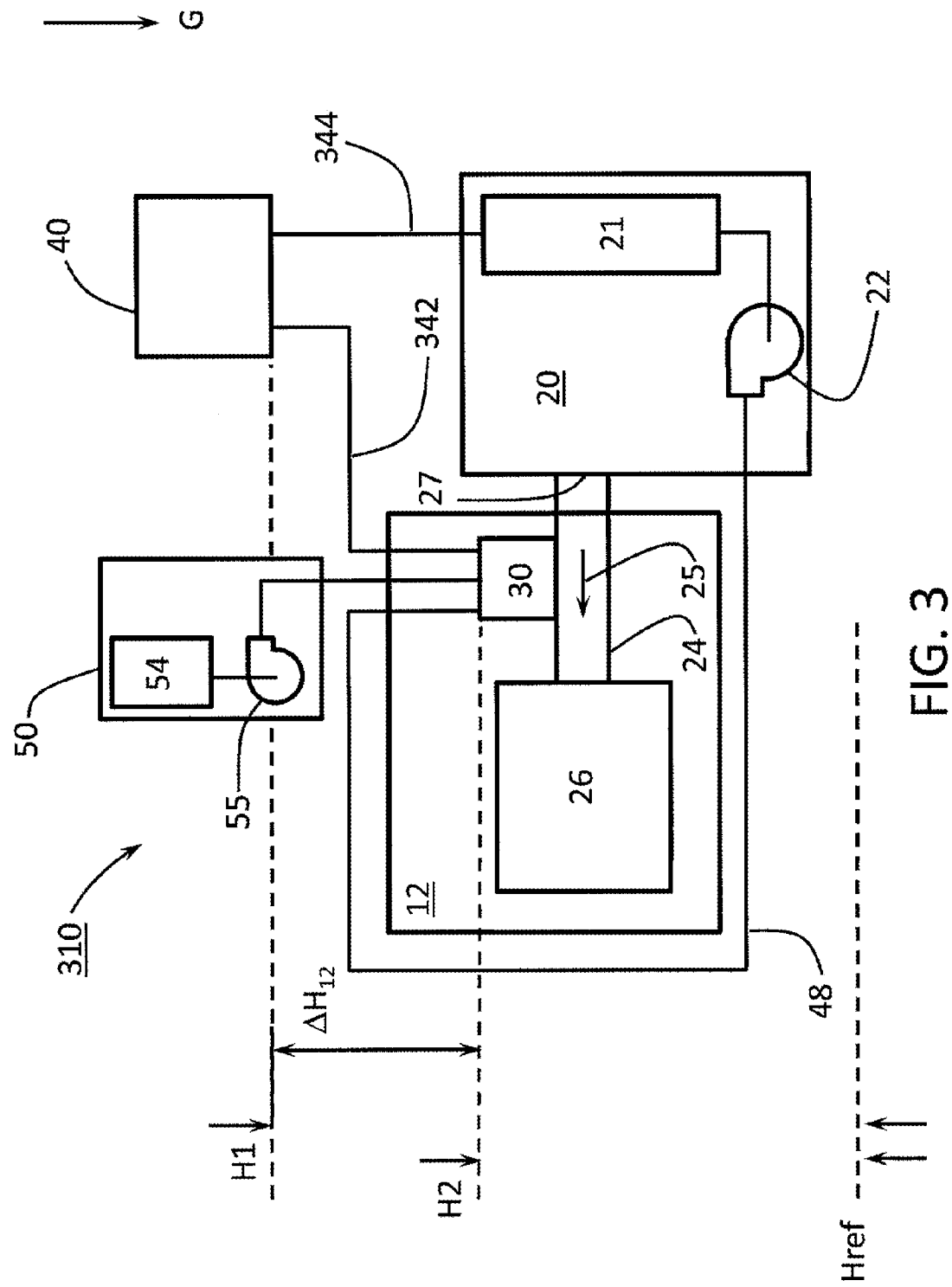
FIG. 3 presents a schematic of a system for cooling a reductant injector in an emissions module, according to yet another embodiment of the present disclosure.

FIG. 3 presents a schematic of a system 310 for cooling a reductant injector in an emissions module, according to yet another embodiment of the present disclosure.

In FIG. 3, the coolant siphon tank 40 is in fluid communication with reductant injector 30 through line 342, and in fluid communication with coolant reservoir tank 21 through line 344. As shown in FIG. 5, the reductant passage 531 is in fluid communication with a reductant inlet 533 and the tip 534 of the injector 30, and the coolant passage 532 is in fluid communication with a coolant inlet 535 and a coolant outlet 536. Similar to line 242, discussed above, the line 342 has sufficient length and internal diameter to meet the requirements for cooling the reductant injector 30 through fluid communication with the coolant siphon tank 40.

Figure 4:
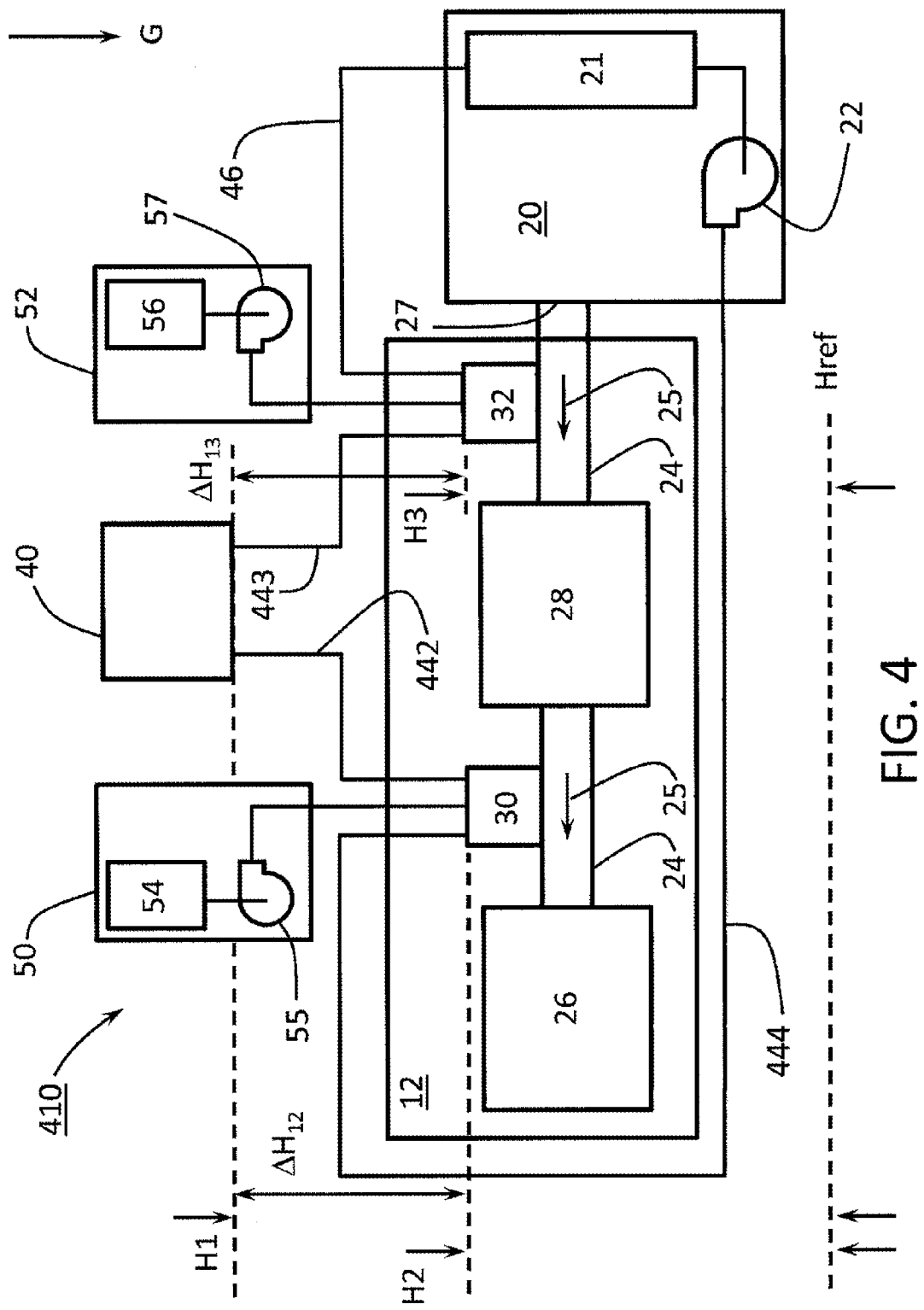
FIG. 4 presents a schematic of a system for cooling a reductant injector and a regeneration injector in an emissions module, according to a further embodiment of the present disclosure.

FIG. 4 presents a schematic of a system 410 for cooling a reductant injector and a regeneration injector in an emissions module, according to a further embodiment of the present disclosure.

In FIG. 4, emissions module 12 includes SCR module 26, a reductant injector 30, and reductant fluid system 50, as well as DPF 28 with an active regeneration system (ARS) including a regeneration injector 32 and a regeneration fluid system 52. DPF 28 is located between the engine 20 and the SCR module 26, and is in fluid communication with the exhaust duct 24.

The regeneration injector 32 is in fluid communication with the exhaust duct 24 upstream of the DPF 28. The regeneration injector 32 receives a regeneration fluid, for injection into the exhaust duct 24, from the regeneration fluid system 52. The regeneration fluid system 52 may include a regeneration fluid reservoir tank 56 and a regeneration fluid supply pump 57. In an alternative embodiment, the regeneration fluid system 52 may omit a regeneration fluid reservoir tank 56, and instead may be connected to another source of regeneration fluid, e.g., a fuel line of the combustion engine 20. In another alternative embodiment, the regeneration fluid system 52 may omit a regeneration fluid supply pump 57, and instead may be supplied with fluid pressure via another source of regeneration fluid pressure, e.g., a fuel pump of the combustion engine 20. Examples of regeneration fluids that may be injected into the exhaust duct 24 through the regeneration injector 32 include diesel fuel, gasoline, propane, methane, hydrogen, or other flammable materials as known to one of ordinary skill in the art.

Regeneration injector 32 includes a regeneration fluid passage 631 (see FIG. 6) in fluid communication with the regeneration fluid supply pump 57, as well as a coolant passage 632 (see FIG. 6) in fluid communication with the coolant supply pump 22 and the coolant siphon tank 40. As shown in FIG. 6, the regeneration fluid passage 631 is in fluid communication with a reductant inlet 633 and the tip 634 of the injector 32, and the coolant passage 632 is in fluid communication with a coolant inlet 635 and a coolant outlet 636.

The coolant siphon tank 40 is in fluid communication with the reductant injector 30 through line 442 and in fluid communication with the regeneration injector 32 through line 443. The regeneration injector 32 is in fluid communication with the coolant reservoir tank 21 through the coolant line 46, and the reductant injector 30 is in fluid communication with the coolant supply pump 22 through line 444. Similar to line 242, as discussed above, the line 442 and the line 443 have sufficient length and internal diameter to meet the requirements for cooling the reductant injector 30 and the regeneration injector 32, respectively, through fluid communication with the coolant siphon tank 40.

Alternatively, the regeneration injector 32 can be in fluid communication with the coolant supply pump 22 and the reductant injector 30 can be in fluid communication with the coolant reservoir tank 21. Such an alternative arrangement could provide lower temperature coolant to regeneration injector 32.

The base of the coolant siphon tank 40 is located at a gravitational elevation H1 above the reference elevation Href. The gravitational elevation H1 is greater than the gravitational elevation H3 of the regeneration injector 32 with respect to the reference elevation Href. The gravitational elevations H1 and H3 may be measured along a direction of a gravitational acceleration G with respect to the reference elevation Href. In one embodiment, the difference $\Delta H_{13}$ between H1 and H3 is not greater than about 36 inches, as further increases in $\Delta$ $H_{13}$ may offer diminishing returns with respect to the tradeoff between thermal siphon performance and system packaging dimensions. In another embodiment, the difference $\Delta H_{13}$ between H1 and H3 is about 8 inches, as this gravitational elevation difference may provide effective thermal siphon performance with favorable packaging dimensions.

INDUSTRIAL APPLICABILITY

The present disclosure is universally applicable to exhaust systems for many types of combustion engines, such as, for example, compression ignition engines including diesel engines and homogeneous charge compression ignition engines, spark ignition engines, Stirling engines, natural gas engines, and various other similar engines. Further, the present disclosure is universally applicable to any exhaust fluid injector that would benefit from cooling after a shutdown of a combustion engine.

An exhaust fluid injector may be actively cooled by forced convection of a cooling fluid through the injector. For example, an exhaust fluid injector could be cooled by engine coolant supplied by an engine coolant pump, which is driven by mechanical power from the engine crankshaft. However, once the engine is shutdown, the engine coolant pump also stops, and the exhaust fluid injector may be susceptible to overheating absent the forced convection of cooling fluid driven by the coolant pump. Advantageous embodiments of the present disclosure cool the exhaust fluid injector after the engine is shutdown.

Referring to the embodiment depicted in FIG. 2, after engine 20 is shutdown, coolant naturally circulates between the reductant injector 30 and the coolant siphon tank 40, thereby cooling the reductant injector 30. More particularly, warmer coolant from the coolant passage 532 (see FIG. 5) of the reductant injector 30 rises through the coolant line 242 and into the coolant siphon tank 40, while cooler coolant from the coolant siphon tank 40 descends through coolant line 242 toward the reductant injector 30.

The warmer coolant rising from the reductant injector 30 may be in a gaseous phase after boiling within the coolant passage 532 of the injector 30, thereby advantageously removing the heat of vaporization of the boiled coolant from the injector 30 at a constant coolant temperature. The density difference between the coolant in the coolant siphon tank 40 and the coolant in the reductant injector 30, as well as the height difference $\Delta H_{12}$ between the coolant siphon tank 40 and the reductant injector 30, drive these buoyant convective processes.

Referring to the embodiment depicted in FIG. 3, after engine 20 is shutdown, coolant naturally circulates between the reductant injector 30 and the coolant siphon tank 40, thereby cooling the reductant injector 30. More particularly, warmer coolant from the coolant passage 532 (see FIG. 5) of the reductant injector 30 rises through the coolant line 342 and into the coolant siphon tank 40, while cooler coolant from the coolant siphon tank 40 descends through the coolant line 342 toward the reductant injector 30. The density difference between the coolant in the coolant siphon tank 40 and the coolant in the reductant injector 30, as well as the height difference $\Delta H_{12}$ between the coolant siphon tank 40 and the reductant injector 30, drive these buoyant convective processes.

According to the embodiment depicted in FIG. 4, after engine 20 is shutdown, coolant naturally circulates between the reductant injector 30 and the coolant siphon tank 40, as well as between the regeneration injector 32 and the coolant siphon tank 40, thereby cooling both the reductant injector 30 and the regeneration injector 32. More particularly, warmer coolant from the coolant passage 532 (see FIG. 5) of the reductant injector 30 rises through coolant line 442 and into the coolant siphon tank 40, while cooler coolant from the coolant siphon tank 40 descends through coolant line 442 toward the reductant injector 30. Similarly, warmer coolant from the coolant passage 632 (see FIG. 6) of the regeneration injector 32 rises through coolant line 443 and into the coolant siphon tank 40, while cooler coolant from the coolant siphon tank 40 descends through coolant line 443 and toward the regeneration injector 32.

The density differences between the coolant in the coolant siphon tank 40 and the coolant in the injectors (30, 32) as well as the height differences, $\Delta H_{12}$ and $\Delta H_{13}$, between the coolant siphon tank 40 and the injectors (30, 32) drive these buoyant convective processes. The warmer coolant rising from the regeneration injector 32 may be in a gaseous phase after boiling within the coolant passage 632 of the injector 32, thereby advantageously removing the heat of vaporization of the boiled coolant from the injector 32 at a constant coolant temperature.

In various embodiments of the present disclosure, coolant flows between the coolant siphon tank 40 and the reductant injector 30 and/or regeneration injector 32 without changing phase. In other words, the temperature of coolant remains below the boiling point, and the coolant may remain in its liquid state throughout the entire cooling process.

In an alternate embodiment of the present invention that includes an auxiliary coolant pump 62 (FIG. 1), the engine 20 coolant supply pump 22 is de-energized when the engine 20 is shut down. In turn, the auxiliary coolant pump 62, which is fluidly coupled to the reductant injector 30, is energized to provide forced convection of coolant to the coolant passage 532 of the reductant injector 30 in order to cool the reductant injector 30 after engine 20 is shutdown.

The many features and advantages of the disclosure are apparent from the detailed specification, and, thus, it is intended by the appended claims to cover all such features and advantages of the disclosure which fall within its true spirit and scope. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A system for cooling an exhaust fluid injector, comprising:
    an emissions module coupled to an engine exhaust duct, the emissions module including:
        a reductant system including a reductant injector having a cooling passage, and
        a selective catalytic reduction (SCR) module; and
    a cooling system fluidly coupled to the emissions module, the cooling system including:
        a reservoir tank,
        a supply pump fluidly coupled to the reservoir tank, and
        a siphon tank fluidly coupled to the supply pump and the cooling passage of the reductant injector, the siphon tank being disposed proximate to the reductant injector, and a gravitational elevation of a base of the siphon tank being greater than a gravitational elevation of the reductant injector.

2. The system of claim 1, wherein the gravitational elevation of the base of the siphon tank is not greater than 36 inches above the gravitational elevation of the reductant injector.

3. The system of claim 2, wherein the gravitational elevation of the base of the siphon tank is 8 inches greater than the gravitational elevation of the reductant injector.

4. The system of claim 1, wherein a volume of the siphon tank is less than 116 cubic inches.

5. The system of claim 1, wherein a volume of the siphon tank is not greater than 200 times a volume of the cooling passage of the reductant injector.

6. The system of claim 1, wherein a tip of the reductant injector is disposed in the engine exhaust duct upstream of the SCR module.

7. The system of claim 1, wherein the reductant system is configured for use with an aqueous urea solution.

8. The system of claim 1, wherein the cooling system includes ethylene glycol.

9. The system of claim 1, wherein the emissions module includes:
    a regeneration system including a regeneration injector having a cooling passage; and
    a diesel particulate filter (DPF) coupled to the engine exhaust duct upstream of the SCR module,
    wherein the siphon tank is fluidly coupled to the cooling passage of the regeneration injector,
    wherein the siphon tank is disposed proximate to the regeneration injector, and
    wherein the gravitational elevation of the base of the siphon tank is greater than a gravitational elevation of the regeneration injector.

10. The system of claim 9, wherein the gravitational elevation of the base of the siphon tank is not greater than 36 inches above the gravitational elevation of the regeneration injector.

11. The system of claim 9, wherein the gravitational elevation of the base of the siphon tank is 8 inches greater than the gravitational elevation of the regeneration injector.

12. The system of claim 1, further comprising a coolant line extending between the siphon tank and the cooling passage of the reductant injector, the coolant line being fluidly coupled to the siphon tank and the cooling passage of the reductant injector, wherein an internal cross sectional area of the siphon tank measured transverse to a direction of gravity is not less than two times an internal cross sectional area of the coolant line measured transverse to the direction of gravity.

13. A method of cooling a reductant injector in an emissions module, the reductant injector having a tip and a cooling passage, the method comprising:

transferring heat from the tip of the reductant injector to coolant disposed within the cooling passage of the reductant injector; and transporting at least a portion of the coolant from the cooling passage of the reductant injector to a siphon tank via buoyant convection, wherein the siphon tank is disposed proximate to the reductant injector, and wherein a gravitational elevation of a base of the siphon tank is greater than a gravitational elevation of the reductant injector.

14. The method of claim 13, wherein an atmospheric boiling point of the coolant is above 100° C.

15. The method of claim 13, wherein the coolant includes ethylene glycol.

16. The method of claim 13, wherein the siphon tank is fluidly coupled to a cooling system including a supply pump and a reservoir tank, and the method further comprises deactivating the supply pump before the transporting at least a portion of the coolant from the cooling passage of the reductant injector to the siphon tank via buoyant convection.

17. The method of claim 13, wherein the emissions module further includes a regeneration injector having a tip and a cooling passage, the method further comprising:

transferring heat from the tip of the regeneration injector to coolant disposed within the cooling passage of the regeneration injector; and buoyantly transporting at least a portion of the coolant from the cooling passage of the regeneration injector to the siphon tank, wherein the siphon tank is disposed proximate to the reductant injector, and wherein the gravitational elevation of the base of the siphon tank is greater than a gravitational elevation of the reductant injector.

* * * * *